F. H. BUCKINGHAM.
PLATFORM LEVER MECHANISM.
APPLICATION FILED NOV. 12, 1908.
967,880.
Patented Aug. 23, 1910.
2 SHEETS—SHEET 1.
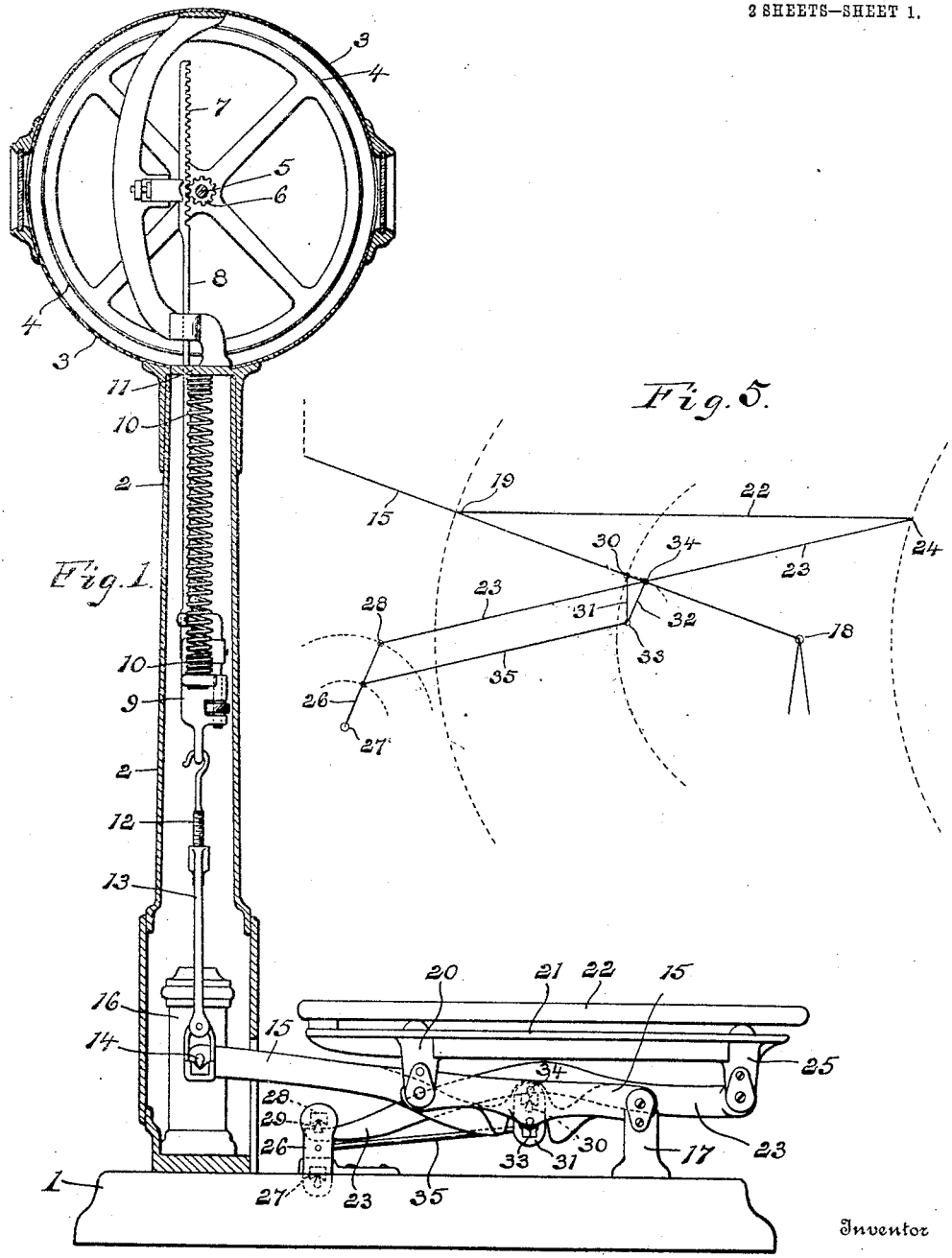
Witnesses
William T. Hewitt
E. M. Brown
Inventor
F. H. Buckingham
By Edward N. Pagelsen
Attorney

F. H. BUCKINGHAM.
PLATFORM LEVER MECHANISM.
APPLICATION FILED NOV. 12, 1908.

967,880.

Patented Aug. 23, 1910.
2 SHEETS—SHEET 2.

Inventor
F. H. Buckingham.

Witnesses
William T. Hewitt
E. M. Brown.

By
Edward N. Pagelsen
Attorney

UNITED STATES PATENT OFFICE.

FREMONT H. BUCKINGHAM, OF DETROIT, MICHIGAN, ASSIGNOR TO THE STANDARD COMPUTING SCALE COMPANY, OF DETROIT, MICHIGAN.

PLATFORM LEVER MECHANISM.

967,880.   Specification of Letters Patent.   Patented Aug. 23, 1910.

Application filed November 12, 1908. Serial No. 462,217.

*To all whom it may concern:*

Be it known that I, FREMONT H. BUCKINGHAM, a citizen of the United States, and a resident of Detroit, in the county of Wayne and State of Michigan, have invented a new and useful Platform Lever Mechanism, of which the following is a specification.

This invention relates to weighing-scales lever, and more particularly to such levers as are especially adapted for spring-balance scales wherein a coiled spring is employed to resist the movement of the levers, and an indicator is actuated by said movement. In order that the indicator may be given the desired actuation it is necessary that the platform lever to which the indicating mechanism is connected shall have an extended movement, and it is the object of this invention to so construct and arrange the platform lever mechanism that it shall have absolute freedom of movement.

My invention consists in the combination of two levers, a platform, and links all so arranged and constructed that the downward pressure exerted by a load on any part of the platform will be resolved into vertical moments with reference to one of the levers, irrespective of the angular position of either lever.

To this end the construction embodying this invention consists in the construction and arrangement substantially as shown and particularly pointed out in the claims, reference being had to the accompanying drawings in which—

Figure 4:
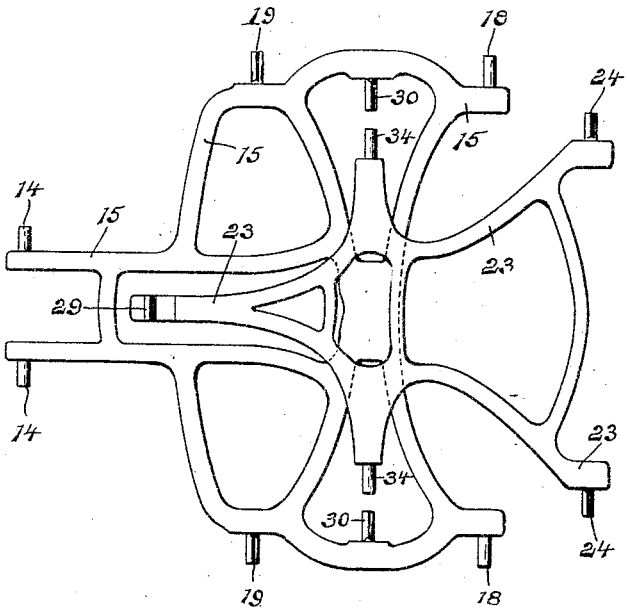
Figure 2:
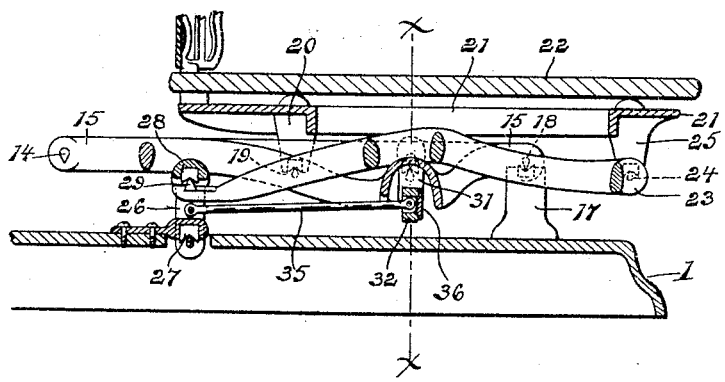
Figure 3:
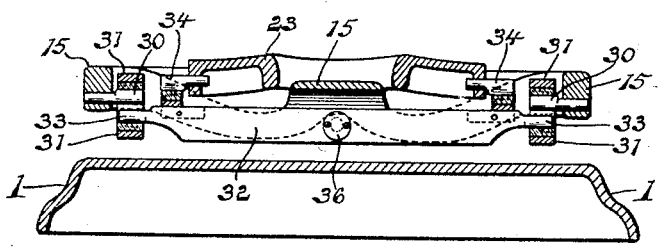

Figure 1 is a vertical section of a scale embodying the invention and showing the platform levers in side elevation. Fig. 2 is a central vertical section through the base of the scale and through the platform levers supported thereon. Fig. 3 is a transverse vertical section on the line $x$—$x$ of Fig. 2. Fig. 4 is a plan view of the levers detached; and Fig. 5 is a diagram showing the movement of the platform lever mechanism.

In the usual beam scale, the poise and weights on the tare beam are for the purpose of keeping the levers and beams balanced. The platform levers are not supposed to change their angular relation to each other or to the remainder of the mechanism. The question to be solved is;—what counter-stress is necessary to prevent the weight from moving the platform or scoop.

In platform-lever spring-scales the distance the platform moves against the force of a spring is to be measured and to do this, the platform and the levers that support it must move with absolute freedom. The pressure exerted by the weight must be vertically applied to the main lever, whether directly or through auxiliary levers, irrespective of the angle through which the levers or platform travel. It is also necessary that none of the force of the weight be expended in overcoming friction or in side thrusts on bearings. It is therefore necessary that all parts move with perfect freedom of movement and that there be no twisting or binding at any of the bearings.

As shown in the drawings, 1 is a suitable base upon the rear end of which is erected a vertical hollow pedestal or column 2 to the upper end of which is secured a horizontally extending cylindrical casing 3 inclosing and supporting a suitable rotary indicating drum 4. This drum is secured to a supporting shaft 5 which is provided with a pinion 6 adapted to engage a rack-bar 7 upon the upper end of a vertically extending rod 8, which rod extends downward within the hollow column and is attached at its lower end to a suitable head 9. One or more coiled springs 10 are attached at their lower ends to the head 9, and at their upper ends are secured to a suitable supporting-bar 11. A draft-rod 12 is attached at its upper end to the head 9 and at its lower end it is provided with a yoke 13 having suitable bearings to receive the knife-edge pivots 14 carried by the main lever 15 of the platform lever mechanism. The extended end of the lever 15 is forked and projects into the lower end of the column 2 at each side of a suitable dash-pot 16.

All of the foregoing parts are constructed and arranged to operate substantially as shown and described in an application filed the 30th day of April, 1908, Serial Number 430,205, and forms no part of this invention.

The main lever 15 of the platform lever mechanism is provided at its rearwardly extended end with the knife-edge pivots 14 and is pivotally supported at its extreme forward end upon supporting-posts 17 on the base 1 by the knife-edge pivots 18 resting on suitable bearing-blocks on said posts. Intermediate its ends this lever 15 is provided with knife-edge pivots 19 to engage suitable bearings carried by the lugs 20 which extend downward from the platform frame 21 upon which the platform 22 rests. An auxiliary lever 23 is provided at its forward end with knife-edge pivots 24 to engage suitable bearing-blocks carried by the lugs 25 extending downward from the forward side of the platform frame.

A link 26 is pivotally connected at its lower end to the base 1 by being provided with a knife-edge pivot to engage a suitable block 27 secured to the base, and at its upper end said link is provided with a bearing-block 28 adapted to be engaged by a knife-edge pivot 29 carried by the rear end of the lever 23. Half-way between the pivots 18 and 19 the main lever 15 is provided with the knife-edge pivots 30, from which pivots hang the loops or links 31. Supported by these loops or links, and extending across and between the same, is a bar 32 provided with projecting knife edge pivots 33 to engage the loops or links. Secured upon this bar adjacent to its pivots are suitable bearing-blocks adapted to be engaged by knife-edge pivots 34 on the auxiliary levers 23 to support said lever intermediate its ends. The auxiliary lever is thus supported and carried by the main lever through the medium of the downwardly hanging loops 31 which permit a longitudinal movement of the auxiliary lever relative to said main lever. The pivots 34 are half-way between the pivots 24 and 29. A distance rod 35 is pivotally attached at one end to the link 26 half-way between the bearings 27 and 28 thereof, and at its opposite end is pivotally attached to the bar 32 in any suitable manner as by providing a hole in the bar to receive a plug 36 which is provided with a slot in which the end of the distance-rod may be pivotally secured.

Referring to the diagram, Fig. 5, it will be seen that when the platform is loaded the bearings 19 and 30 of the lever 15 move in arcs having the bearing 18 for a center. The platform 22, being connected at 19 to the lever 15, will also move in the same arc as the bearing 19. These arcs may be resolved into their vertical and horizontal components. As the link 26 is connected to the lever 23 at 28, the horizontal movement of the free end of the link will be practically that of the points 19, 24, and 34. As the point 30 is half-way between 18 and 19, the horizontal and vertical components of the movement of the bearing 30 will be one half those of the bearing 34 but in the same directions. When the levers are depressed by a load, the bearings 34 will move rearwardly, passing the line of the bearings 30. The rod 35 being connected to the middle point of the link 26, the bearings 33 will move rearwardly just one half as fast as the bearings 34, that is, at the same rate as the bearings 30. In other words, the line of the bearings 33 will always be vertically under the line of the bearings 30. By this construction, the effective lines of the bearings 30 and 34 may be at the same level without binding or diagonal thrusts. It will also be noticed that the parts are so proportioned that the rod 35 and the lever 23 are parallel so that the link 32 will always be parallel to the link 26. This secures perfect movement of the levers on their knife-edge bearings. The pressure of any load on the platform will be transmitted to the lever 15 directly at 19 or indirectly at 30, but will always be in vertical lines. Considering a concrete case. The distances 19—30 and 30—18, are three inches, the vertical height between 18 and 19 runs from one inch above to one inch below horizontal. The length of 32 is one inch and of 26 is two inches. The vertical angle of 15 will vary from 9¼ degrees above to the same amount below a horizontal line. The distances 24—34 and 34—28 are equal. The horizontal distance traveled by 19 when moving to the horizontal plane of 18 will therefore be the versed sine of this angle which is .084 inch. The bearing 32 is one twelfth of an inch in front of the bearing 30 when the platform is unloaded and the same distance to the rear when the full load is on the scale. The distance .084 inch is also one half of the horizontal movement of the bearing 28. This gives the link a movement of 2½ degrees each way from the vertical. The vertical component of this movement is .0017 inch and of the point 34 is just one half this amount. The movements below the horizontal line of the pivot 18 are the same as above. The bearing 24 is therefore the pivot, when the vertical movements of 28 and 34 are considered, which explains why the platform will always remain level throughout its movement. The distance between the pivots 28 and 24 will always have the same proportion to the distance between pivots 28 and 34, as the distance between the pivots 19 and 18 bears to the distance between the pivots 30 and 18. There is no absolute necessity for the levers 15 and 23 having their pivots 30 and 34 half way between adjacent pivots, it merely happens to be desirable from the manufacturer's standpoint. The point of connection of the rod 35 to the link 26 will also hold to the same rule of proportion.

Having now explained my improvements, what I claim as my invention and desire to secure by Letters Patent is:—

1. In a platform scale lever mechanism, the combination of a main lever, a fixed pivot for one end of the same, an indicator connected to the other end of the main lever, an auxiliary lever, a platform supported by said levers, a swinging pivot for one end of the auxiliary lever, links connecting intermediate points of the levers, and means extending between said links and swinging pivot for causing a plurality of said links to hang vertically under the point of connection with the main lever.

2. In a platform scale lever mechanism, the combination of a base, a platform, a pair of levers supporting the platform, a link connecting one lever to the base, a second link connecting said levers at points intermediate their ends, and means to hold said links parallel to each other.

3. In a platform-scale lever mechanism, the combination of a main lever having knife-edge pivots at both ends and intermediate its ends, a base, a support for the pivots at one end of the main lever mounted on the base, an indicator connected to the pivots at the opposite end of the lever, an auxiliary lever provided with knife-edge pivots at both ends and intermediate its ends, a weight receiver resting on pivots intermediate the ends of the main lever and at one end of the auxiliary lever, a knife-edge pivot mounted on the base, a link engaging the same and a pivot at the opposite end of the auxiliary lever, connecting links between pivots on the levers, and a controlling device between the links.

4. In a scale lever mechanism, the combination of a pair of levers, pivots for one end of each lever, connecting links between said levers, and a weight receiver engaging one lever intermediate its ends and the other lever at one end.

5. In a platform-scale lever mechanism, the combination of a main lever pivotally supported at one end and adapted to be connected to the indicating means at its opposite end, an auxiliary lever, a platform supported by the main lever at a point intermediate the ends of said lever, and by one end of said auxiliary lever, and links connecting said levers to support the auxiliary lever upon the main lever and permit the auxiliary lever to move with the platform and relatively to the main lever.

6. In a platform-scale lever mechanism, the combination of a main lever pivotally supported at one end, an auxiliary lever, a platform supported by the main lever and one end of the auxiliary lever, means connecting said levers and permitting a relative longitudinal movement, and retaining means for the opposite end of said auxiliary lever adapted to permit said longitudinal movement thereof.

7. In a platform-scale lever mechanism, the combination of a main lever pivotally supported at one end, an auxiliary lever, a platform supported by the main lever and by one end of said auxiliary lever, retaining means for the opposite end of said auxiliary lever adapted to permit said lever to move longitudinally, and means for supporting the auxiliary lever upon the main lever and permitting a relative movement between the said levers.

8. In a platform scale lever mechanism, the combination of a main lever pivotally supported at one end, an auxiliary lever, a platform supported by the main lever and by one end of said auxiliary lever, a link pivotally attached to the opposite end of said auxiliary lever and adapted to swing to permit a relative movement between the levers, and means for supporting the auxiliary lever from the main lever and permitting a relative movement between said levers.

9. In a platform-scale lever mechanism, the combination of a main lever pivotally supported at one end and adapted to be connected to indicating means at its opposite end, an auxiliary lever, a platform supported by the main lever at a point intermediate the ends of said lever, links pivotally connected to the main lever and extending downward a cross bar to support the auxiliary lever and pivoted in said links so as to permit a relative movement between said levers, and means for maintaining said links in a vertical plane.

10. In a platform-scale lever mechanism, the combination of a main lever pivotally supported at one end, an auxiliary lever, a weight receiver supported by the main lever and by one end of the auxiliary lever, a movable pivot for the opposite end of said auxiliary lever, and loops to support the auxiliary lever from the main lever.

11. In a platform-scale lever mechanism, the combination of a main lever pivotally supported at one end, an auxiliary lever, a platform supported by the main lever and by one end of said auxiliary lever, means pivotally attached to a fixed support and pivotally attached to the opposite end of said auxiliary lever, and loops carried by the main lever and supporting at their lower ends the auxiliary lever intermediate its ends.

12. In a platform-scale lever mechanism, the combination of a main lever pivotally supported at one end, an auxiliary lever, a platform supported by the main lever and by one end of said auxiliary lever, a pivoted connection between said auxiliary lever and a fixed support for permitting the longitudinal movement of said lever, means pivotally attached to the main lever and hanging downward therefrom, a cross bar for attaching the auxiliary lever to the lower end of said hanging means and permitting a longitudinal movement of said lever relative to said hanging means and a rod extending between the pivoted connection and the cross bar.

13. In a platform-scale lever mechanism, the combination of a main lever pivotally supported at one end and adapted to be connected to indicating means at its opposite end, an auxiliary lever, a platform supported by the main lever at a point intermediate the ends of said lever and by one end of said auxiliary lever, means pivotally attached to the opposite end of said auxiliary lever to pivotally hold the same and permit a longitudinal movement of said lever, means pivotally attached at its upper end to the main lever and hanging downward therefrom, a cross bar pivotally supporting the auxiliary lever intermediate its ends and pivotally carried by the lower end of the downwardly hanging means and means connecting the cross bar and the pivotal connection at the end of the auxiliary lever.

14. In a platform-scale lever mechanism, the combination of a main lever pivotally supported at one end and adapted to be connected to indicating means at its opposite end, an auxiliary lever, a platform supported by the main lever at a point intermediate the ends of said lever and by one end of said auxiliary lever, a link for connecting the opposite end of said auxiliary lever to a fixed support and permitting a longitudinal movement of said lever, a downwardly hanging loop carried by the main lever, a bar pivotally supporting at its upper end the auxiliary lever intermediate the ends thereof and pivotally engaging at its lower end the lower end of said loop to turn relatively thereto and a rod connecting the link and bar.

15. In a platform-scale lever mechanism, the combination of a main lever pivotally supported at one end and adapted to be connected to indicating means at its opposite end, an auxiliary lever, a platform supported by the main lever at a point intermediate the ends of said lever and by one end of said auxiliary lever, a pivoted link pivotally attached to the opposite end of said auxiliary lever, downwardly hanging means carried by the main lever, means for supporting the auxiliary lever pivotally attached to the lower end of said downwardly hanging means, and a connector in engagement with said pivoted link and the supporting device for the auxiliary lever for maintaining the downwardly hanging means in a vertical plane as the main lever rises and falls.

16. In a platform-scale lever mechanism, the combination of a main lever pivotally supported at one end and adapted to be connected to indicating means at its opposite end, an auxiliary lever, a platform supported by the main lever at a point intermediate the ends of said lever and by one end of said auxiliary lever, a loop pivotally carried by the main lever, means pivotally supported by the lower end of said loop to turn thereon and supporting said auxiliary lever at a distance from its pivotal support on said loop equal to the distance from said point of support to the pivot of said loop on the auxiliary lever, and means for maintaining said loop in a vertical plane.

17. In a platform-scale lever mechanism, the combination of a main lever pivotally supported at one end and adapted to be connected to indicating means at its opposite end, an auxiliary lever, a platform supported by the main lever at a point intermediate the ends of said lever and by one end of said auxiliary lever, a pivoted link pivotally attached at its upper end to the opposite end of said auxiliary lever, loops carried by the main lever, means for supporting the auxiliary lever carried by the lower ends of said loops and a distance-rod attached at one end to said link to hold the loops in a vertical position and at the other end to said pivoted link.

18. In a platform-scale lever mechanism, the combination of a main lever pivotally supported at one end and adapted to be connected to indicating means at its opposite end, an auxiliary lever, a platform supported by the main lever at a point intermediate the ends of said lever and by one end of said auxiliary lever, a link pivoted to a fixed support at its lower end and to the opposite end of said auxiliary lever at its upper end, loops carried by the main lever and hanging downward therefrom, a cross-bar carried by the lower ends of said loops and adapted to support the auxiliary lever and to turn upon said loops when the auxiliary lever is moved longitudinally relative to the main lever, and a distance-rod connected to said link at one end and to said cross-bar at its opposite end.

19. In a platform-scale lever mechanism, the combination of a main lever pivotally supported at one end and adapted to be connected to indicating means at its opposite end, an auxiliary lever, a platform supported by the main lever at a point intermediate the ends of said lever and by one end of said auxiliary lever, a link pivotally attached to a fixed support at one end and to the opposite end of said auxiliary lever at its outer end, loops pivotally carried by the main lever, a cross-bar having bearings at its ends engaging the lower ends of said loops and provided with bearings at its upper side to support the auxiliary lever intermediate the ends of said lever, and a distance-rod pivotally attached to the cross-bar and to the said link intermediate the ends thereof.

20. In a platform-scale lever mechanism, the combination of a base, a platform, two levers supporting the same, a fixed pivot for one lever, a swinging connection between the base and the other lever, a swinging connection between the levers, and means to hold these connections parallel to each other.

21. In a platform-scale lever mechanism, the combination of a pair of levers, a platform supported thereby, said platform connected to the free end of one lever and between the ends of the other, and a flexible connection including links between the levers.

22. In a platform-scale lever mechanism, the combination of a pair of levers, a portion of one extending above the other, a platform connected to the free end of one lever and intermediate the ends to the other, said levers having pivots intermediate their ends adapted at times to be in the same vertical plane, and means to connect said pivots.

In testimony whereof I have signed this specification in the presence of two subscribing witnesses.

F. H. BUCKINGHAM.

Witnesses:
G. E. RENTON,
GEORGE CARLETON.